Aug. 14, 1928.  S. E. TRAVIS, JR  1,681,021
SIDE RAIL TRUCK BODY
Filed March 17, 1926   2 Sheets-Sheet 1
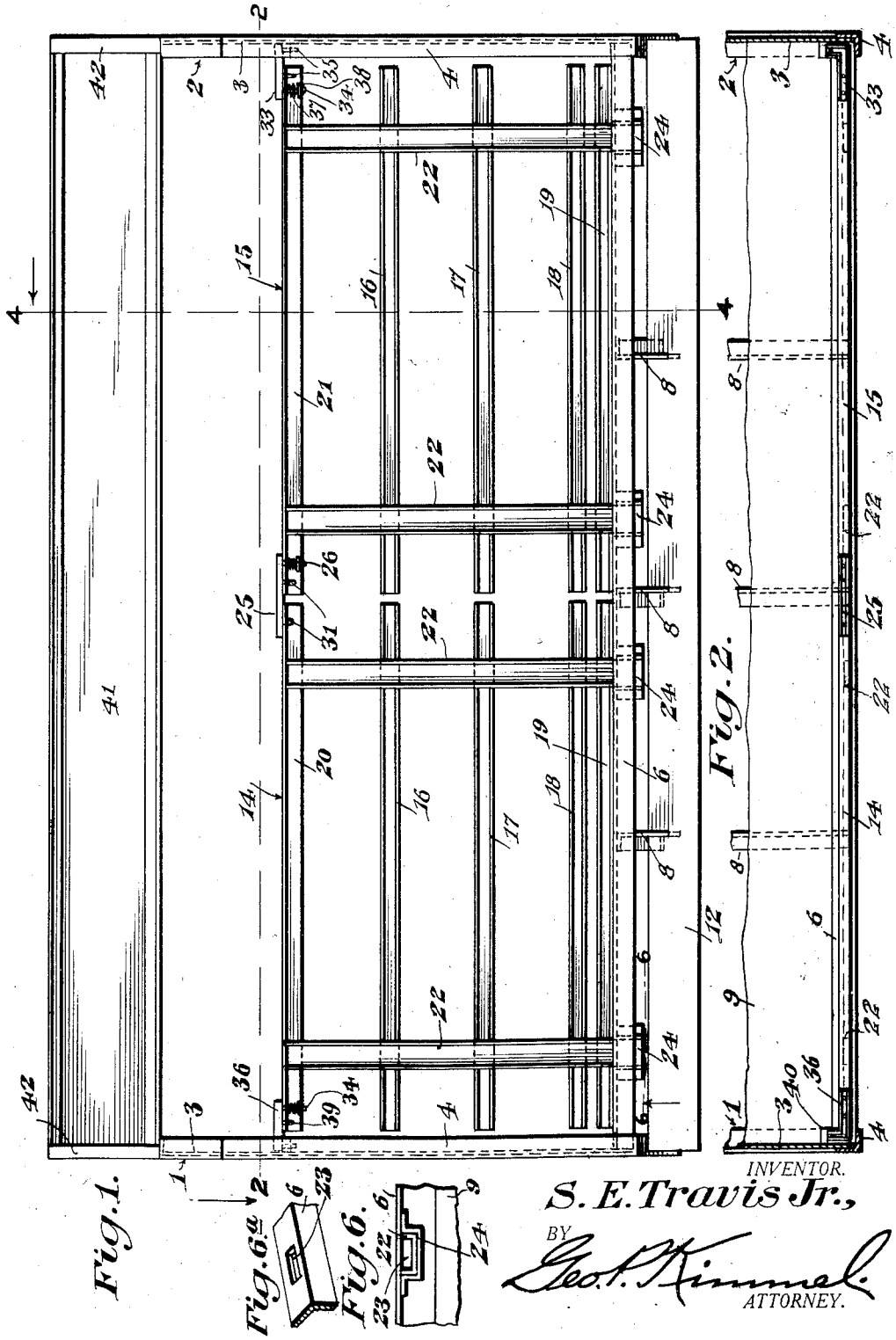
INVENTOR.
S. E. Travis Jr.,
BY
Geo. P. Kimmel
ATTORNEY.

Aug. 14, 1928.
S. E. TRAVIS, JR
1,681,021
SIDE RAIL TRUCK BODY
Filed March 17, 1926
2 Sheets-Sheet 2
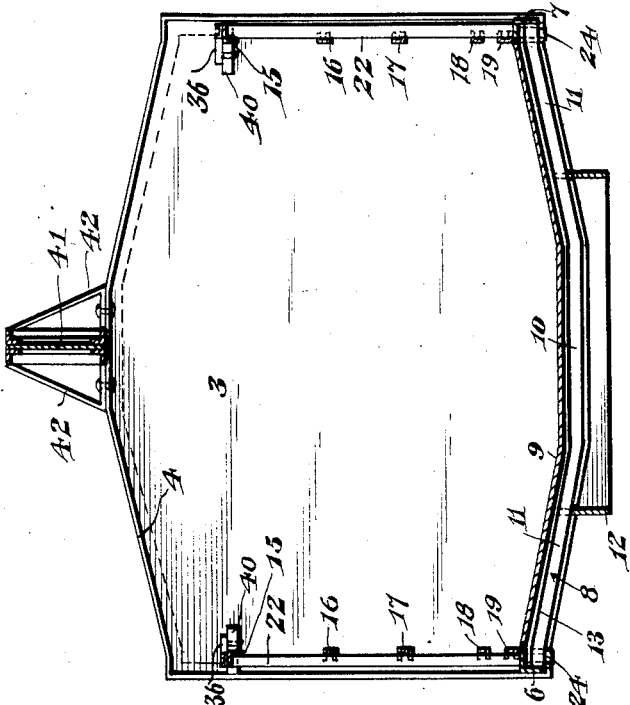
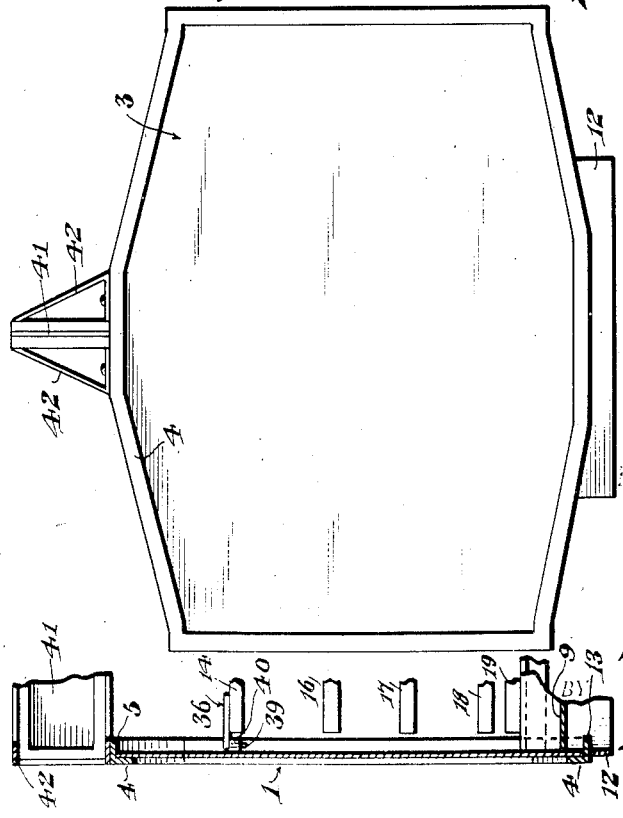
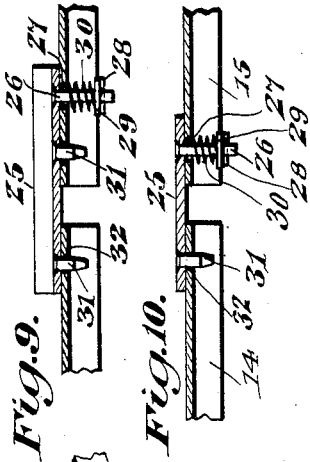
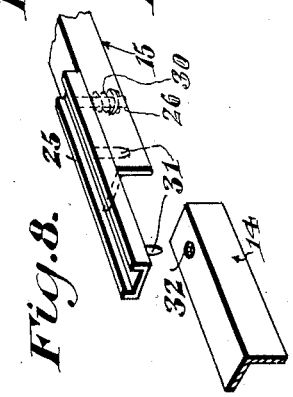
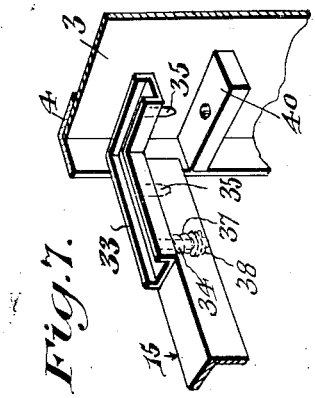
INVENTOR.
S. E. Travis Jr.,
BY Geo. P. Kimmel
ATTORNEY.

Patented Aug. 14, 1928.

1,681,021

UNITED STATES PATENT OFFICE.

SIMEON E. TRAVIS, JR., OF HATTIESBURG, MISSISSIPPI.

SIDE-RAIL TRUCK BODY.

Application filed March 17, 1926. Serial No. 95,332.

This invention relates to a truck body, designed primarily for the handling of crated, cased or boxed bottled goods, but it is to be understood that a truck body, in accordance with this invention, can be employed for the handling of any character of truckage for which it is found applicable, and the invention has for one of its objects to provide, in a manner as hereinafter set forth, a truck body constructed and arranged whereby the load will at all times tend to be stationary and further reducing slide slippage thereof to a minimum.

A further object of the invention is to provide, in a manner as hereinafter set forth, a truck body that can be easily loaded and unloaded and carry its load to the best advantage under all road conditions.

A further object of the invention is to provide, in a manner as hereinafter set forth, a truck body including removable side rails to permit of loading and unloading from either side thereof and further for retaining the load upon the bottom of the truck body.

A further object of the invention is to provide, in a manner as hereinafter set forth, a truck body provided with removable end rails whereby access can be had to the truck body from either end thereof.

Further objects of the invention are to provide, in a manner as hereinafter set forth, a truck body designed to be attached to any form of truck, which is simple in its construction and arrangement, strong, durable, compact, thoroughly efficient when used, readily installed with respect to a truck, of minimum weight and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a truck body, in accordance with this invention, of the removable side rail type.

Figure 2 is a fragmentary view, in plan, taken on line 2—2, Figure 1.

Figure 3 is an end view of the truck body.

Figure 4 is a section on line 4—4 Figure 1.

Figure 5 is a fragmentary view, in longitudinal section, of one end of the truck body.

Figure 6 is a section on line 6—6 Figure 1.

Figure 6A is a fragmentary view of a side member of the truck body showing an opening which associates with a cleat for receiving one of the vertical bars of a side rail section.

Figure 7 is a fragmentary view in perspective illustrating the latch between a side rail section and an end frame of the truck body.

Figure 8 is a disassembled view in perspective illustrating the latch between the sections of the side rails.

Figure 9 is a fragmentary view in longitudinal section illustrating the latch between the sections of the side rails.

Figure 10 is a longitudinal sectional view of a modified form of latch between the sections of the side rails.

Referring to Figures 1 to 9 of the drawings, a truck body of the side rail type, in accordance with this invention, comprises a pair of polygonal shaped upstanding end frames or members 1 and 2 and which are oppositely disposed with respect to each other and each of which has the opening formed thereby closed by a panel 3 conforming in contour to the shape of the frame. Each end frame is of like construction and its body portion is angle-shaped in cross section as clearly shown in Figure 5, and which provides what may be termed a continuous outer arm 4 and an inwardly extending continuous arm 5. The panels 3 abut against the inner faces of the arms 4, 5, as clearly shown in Figure 5. The panels 3 are suitably secured to the frames 1 and 2. The frames 1 and 2 are connected together by a pair of side frame members 6, 7 and each of which is in the form of an angle bar of appropriate length. The bottom of each end frame is formed with a pair of inclined parts and a horizontal part arranged between the inclined part and these latter extend outwardly from and at an upward inclination with respect to said horizontal part. Each side member includes a vertically disposed and a horizontally disposed leg and with the latter projecting inwardly from the upper end of the former. The vertical legs of the side members are mounted on edge upon the bottom portions of the arms 5 of the end frames 1 and 2 and said vertical legs, as well as the horizontal legs, at their ends, abut against the lower portions of the panels 3. The side members are secured to the panels 3. The vertical legs of the side members 6 and 7 are also secured to the inner faces of the arms 4 of the end frames at the lower ends of the sides of said arms 4 and the arrangement of the side members 6 and 7 with respect to either of the end frames and its panel is clearly shown in Figures 4 and 5 and also shown in Figure 1.

Secured to the inner faces of the vertical legs of the side members 6 and 7 are transversely extending combined bracing and supporting members 8 for the bottom or floor 9 of the truck body. The members 8 are arranged in spaced relation and each is in the form of an angle bar and set up with a flat central portion 10 and a pair of upwardly inclined end portions 11. The floor or bottom 9 of the truck body conforms in shape to the shape of the members 8 and these latter conform in shape to the bottoms of the end frames 1, 2. The bottom or floor 9 at its side edges is flush with the horizontally disposed legs of the side members 6 and 7 and is furthermore secured therewith and by this arrangement the horizontal legs of the side members 6 and 7 form continuations of the bottom or floor 9 of the truck body. See Figure 4.

Arranged below the bottom or floor 9 is a rectangular subframe 12 having slotted ends. The frame 12 is connected to the end frames 1 and 2 and the lower portions of said end frames extend into the slotted ends of the sub-frame as indicated at 13 in Figure 5.

The truck body includes a pair of sectional side rails and as shown each side rail is formed of two sections, but it is to be understood that the number of sections of each side rail can be increased. Each side rail is detachably connected to a side member 6 or 7 and further detachably connected to the end frames 1 and 2. The sections of each side rail are also detachably connected. As both side rails are of the same construction, but one will be described, as the description of one will apply to the other. Each side rail is of appropriate height, preferably of less height than the height of the end frames and each side rail consists of a pair of sections 14, 15. Each section consists of longitudinally extending spaced channel shaped bars 16, 17, 18 and 19 and an upper longitudinally extending angled-shaped bar. The angle-shaped bar for the section 14 is indicated at 20 and the angle-shaped bar of the section 15 is indicated at 21. Each angle-shaped bar includes a vertically disposed and a horizontally disposed leg and the latter projecting outwardly from the upper end of the former. The bars 16, 17 and 18 are equally spaced from each other and the angle-shaped bar of a section is spaced the same distance from the bar 16 as the latter is spaced from the bar 17. The bar 19 is the bottom bar of a frame section and spaced a closer distance to the bar 18 than the distance between the bars 17 and 18. When the rail sections are mounted in upright position the bars 19 thereof seat on the side members 6 and 7. Each rail section further includes a pair of vertically extending uprights 22 formed from channel shaped bars and each of which is arranged in proximity to the ends of the longitudinal bars of the rail section. The uprights 22 are secured to the flanges of the bars 16, 17, 18 and 19 and also to the outer face of the vertical legs of a bar 20 or 21. The uprights 22 abut against the horizontal leg of a bar 20 or 21 and depend below the bar 19 of the rail section and when the section is in an upright position the lower projecting ends of the upright 22 extend through openings 23 formed in the horizontal legs of the side members 6 and 7 and also through cleats 24 secured to the inner faces of the vertical legs of the side members 6 and 7.

The rail sections of each rail are arranged in spaced relation with respect to each other and also in spaced relation with respect to the end frames 1 and 2. The rail sections of each rail are detachably connected by a spring controlled latching device which consists of a flat bar 25 mounted upon the upper faces of the horizontal legs of the bars 20 and 21. The flat bar 25 is provided with a pin 26, which as shown extends through an opening 27 formed in the horizontal leg of the bar 21. The lower end of the pin 26 carries a transversely extending pin 28, upon which is mounted a washer 29, and interposed between the washer 29 and the horizontal legs of the bar 21 and surrounding the pin 26 is a controlling spring 30. The bar 25 is furthermore formed with a pair of spaced depending pins or lugs 31 having tapered lower ends and which extend through openings 32 formed in the horizontal legs of the bars 20 and 21 in proximity to the other ends thereof. See Figure 9. When the pins 31 are extended through the openings 32 the opposed ends of the rail sections are detachably connected together.

The other end of each rail section is detachably connected with an end frame 1 or 2, and for this purpose a latching device is employed which consists of an L-shaped plate 33 provided with a depending pin 34 and a pair of depending lugs or pins 35 having tapered lower ends. The pin 34 extends through an opening 36 formed in the horizontal leg of the bar 20 or 21 and carries a controlling spring 37 which is interposed between the lower face of the horizontal leg of the top bar of a rail section and a washer 38 which is supported on the lower end of the pin 34. One of the pins 35 is adapted to extend through an opening 39 formed in the horizontal leg of a top bar of a rail section and the other pin 35 is adapted to extend into an apertured lug 40 secured to the frame member 1 or 2 and against the inner face of the panel 3. See Figure 7.

Mounted upon the top of the end frames 1 and 2 and extending from one to the other thereof is a sign 41 which is secured and braced in position by straps 42 which overlaps each end of the sign 41 and are secured to the end frames.

The brace members 8 extend through the sub-frame 12, see Figure 4. The parts of the truck body which are fixedly secured to each other are welded together, other than the straps 42. It is to be understood that the parts of the truck body which are connected together can be secured in fixed relation by any suitable means.

What I claim is:—

1. A truck body comprising a pair of upstanding end members each having its bottom of angle shaped cross section to provide a vertical portion and a horizontal portion extending inwardly at right angles to the lower end of the vertical portion, a pair of oppositely disposed side members each of angle shaped cross section to provide a vertical portion and a horizontal portion extending inwardly from the upper end of the vertical portion, the ends of the vertical portions of said side members seated on the horizontal portions of said end members in spaced relation, and a bottom extending from one end member to the other and secured to the horizontal portions of said side members.

2. A truck body comprising a pair of upstanding end members each having its bottom of angle shaped cross section to provide a vertical portion and a horizontal portion extending inwardly at right angles to the lower end of the vertical portion, a pair of oppositely disposed side members each of angle shaped cross section to provide a vertical portion and a horizontal portion extending inwardly from the upper end of the vertical portion, the ends of the vertical portions of said side members seated on the horizontal portions of said end members in spaced relation, a bottom extending from one end member to the other and secured to the horizontal portions of said side members, and spaced brace members secured to the inner faces of the vertical portions of said side members and arranged below said horizontal portions of said side members.

3. A truck body comprising a pair of upstanding end members each having its bottom formed with a horizontal part and a pair of oppositely extending inclined parts projecting outwardly from and at an upward inclination with respect to said horizontal part, the bottom of each of said members of angle shaped cross section to provide a vertical portion and a horizontal portion extending inwardly at right angles from the lower end of the vertical portion, a pair of spaced oppositely disposed side members each of angle shaped cross section to provide a vertical portion and a horizontal portion extending inwardly from the upper end of the vertical portion thereof, the ends of the vertical portions of said side members seated on the outer ends of the horizontal portions of the inclined part of said end members, and a bottom member of the same contour as the bottom of said end members, extending from one end member to the other and secured to the horizontal portions of said side members.

4. A truck body comprising a pair of upstanding end members each having its bottom formed with a horizontal part and a pair of oppositely extending inclined parts projecting outwardly from and at an upward inclination with respect to said horizontal part, the bottom of each of said members of angle shaped cross section to provide a vertical portion and a horizontal portion extending inwardly at right angles from the lower end of the vertical portion, a pair of spaced oppositely disposed side members each of angle shaped cross section to provide a vertical portion and a horizontal portion extending inwardly from the upper end of the vertical portion thereof, the ends of the vertical portions of said side members seated on the outer ends of the horizontal portions of the inclined parts of said end members, a bottom member of the same contour as the bottom of said end members, extending from one end member to the other and secured to the horizontal portions of said side members, and brace members arranged below and corresponding in contour to the shape of said bottom member and extending from and secured to the inner faces of the vertical portions of said side members.

In testimony whereof, I affix my signature hereto.

SIMEON E. TRAVIS, Jr.